March 9, 1965     H. T. ADKINS     3,173,076
HIGH SPEED GENERATOR

Filed July 7, 1960     3 Sheets-Sheet 1

INVENTOR.
HAROLD T. ADKINS
BY
Dale A. Winnie
ATTORNEY

March 9, 1965   H. T. ADKINS   3,173,076
HIGH SPEED GENERATOR

Filed July 7, 1960   3 Sheets-Sheet 2

INVENTOR.
HAROLD T. ADKINS
BY
Dale A. Winnie
ATTORNEY

March 9, 1965   H. T. ADKINS   3,173,076
HIGH SPEED GENERATOR
Filed July 7, 1960   3 Sheets-Sheet 3

INVENTOR.
HAROLD T. ADKINS
BY
Dale A. Winnie
ATTORNEY

United States Patent Office 3,173,076
Patented Mar. 9, 1965

3,173,076
HIGH SPEED GENERATOR
Harold T. Adkins, St. Clair Shores, Mich., assignor to Curtiss-Wright Corporation, Utica, Mich., a corporation of Delaware
Filed July 7, 1960, Ser. No. 41,412
13 Claims. (Cl. 322—47)

This invention relates to electrical power generating means, and more particularly to inductor type electrical power generators and related circuitry capable of producing a desired output frequency independent of the shaft operating speed.

It is an object of this invention to disclose a generator capable of being directly driven by any means at exceptionally high and non-synchronous speeds, as regards conventionally accepted standards, and a circuitry usable therewith to provide a low frequency output suitable for general power uses.

The generator of this invention is of the inductor type and requires no slip rings or brushes. All field and power windings are provided within the stator assembly and no windings are required on the rotor member. By means of high speed operation, and the novel arrangement of pole faces and of control and power conductive windings, a high power output is obtained from a small lightweight and compact assembly. With related external modulation and rectification of the high amplitude high frequency power output, or amplitude modulation of the field windings to obtain a desired low frequency envelope capable of rectification, switching and filtering, when necessary, desired and normal A.C. power frequencies are obtained independent of fluctuations in the speed of the generator driving power source.

The high speed generator output controlling circuitry of this invention provides an output voltage and wave form independent of excessive generator voltage. The circuit also obviates the need for specific field regulation or modulation and is capable of providing multiple phase output without the need for multiple or multiple-sectioned generators. Such circuitry includes comparator aspects whereby the output voltage, wave form, etc. will be independent of load characteristics.

These and other objects and advantages in the practice of this invention will be more apparent upon a reading of the following specification in conjunction with the accompanying drawings.

Figures 1, 2:
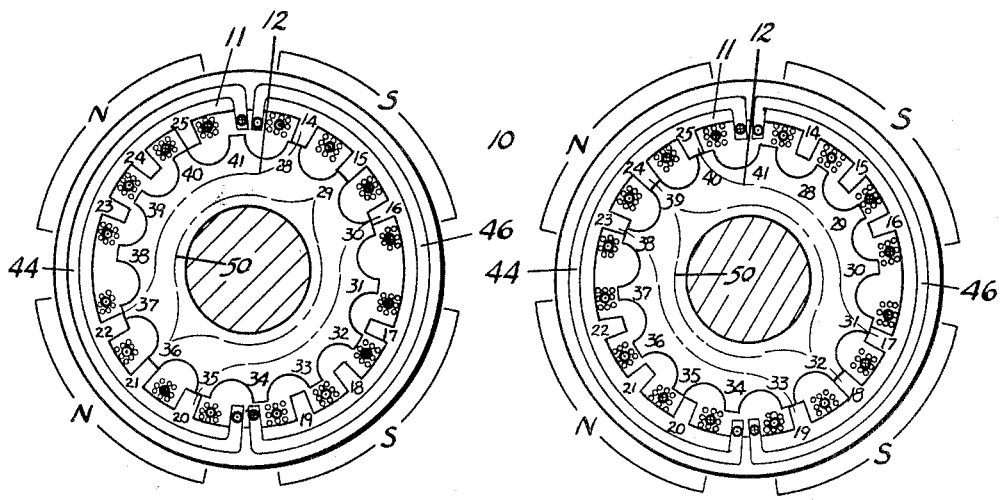
FIGURE 1 is a diagrammatical illustration of one form of stator winding and rotor-stator configuration suitable for use in the practice of this invention.
FIGURE 2 is similar to FIGURE 1 with the rotor shown in a 180° electrically advanced position.

Referring to the drawings in further detail:

FIGURES 1 and 2 show a generator 10 having a laminated stator 11 and a rotor 12 rotatably supported concentrically therewithin. The stator 10 is shown to include teeth 14–25. The rotor is of laminated construction also and is formed to include teeth 28–41. The spacing of the lesser teeth in the stator affords oppositely disposed tooth blanks receptive of the effective portions of the field windings 44 and 46. The field windings 44 and 46 are a skein type winding each encompassing one-half of the total number of stator teeth. Although not specifically shown, it will be subsequently appreciated that the field windings could be toroidal rather than skein wound.

Figure 3:
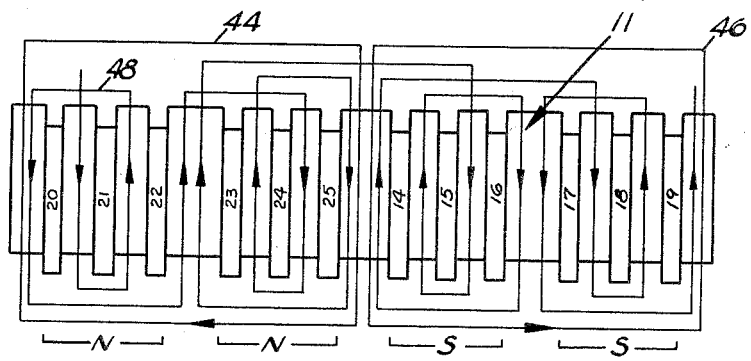
FIGURE 3 is an open projection of the stator of FIGURES 1 and 2 to show the direction of winding, etc., therein.

Between the stator teeth is provided a power winding 48. Power winding 48 may be one or more turns wound alternately clockwise and counter clockwise around one or more stator teeth groups, as shown by FIGURE 3, or may be inclusive of separate and like tooth group windings, of one or more turns, externally connected for the desired result.

The rotor teeth are equally spaced and include a tooth pitch different from, and greater than, that of the stator teeth. The stator teeth are provided in quadrant groups of three which form power winding poles, designated N and S, as applicable. Like power winding poles N, within the field winding 44, and S, within the field winding 46, comprise the field winding poles N, N and S, S, respectively.

It will be appreciated that the generator described is inclusive of one or more field winding pole groups arranged in a complete circle or a portion thereof.

The difference in the pitch, as regards the rotor and stator teeth, causes alternate alignment, or partial alignment, of the teeth with a resultant path for the flux lines 50 of an electrical width equal to a power pole. This alternate alignment comes about for each tooth progression of the rotor. The flux cutting the winding 48 about a power pole group 20–22 etc. thus varies from a minimum to a maximum level for each full rotor tooth movement.

A current through the field windings 44 and 46 establishes the general flux pattern and the specific relative tooth positions establish the flux path within that pattern. The total flux induced by the field windings remains constant while the maximum flux path switches from power pole to power pole. This changing flux level generates the voltage within the power windings 48 which is proportionate to the number of turns, the flux change per unit of time and the level of flux change. By power frequency variation of the field current, the maximum level of the flux changes can be varied to obtain amplitude modulation of the high frequency output.

Figure 4:
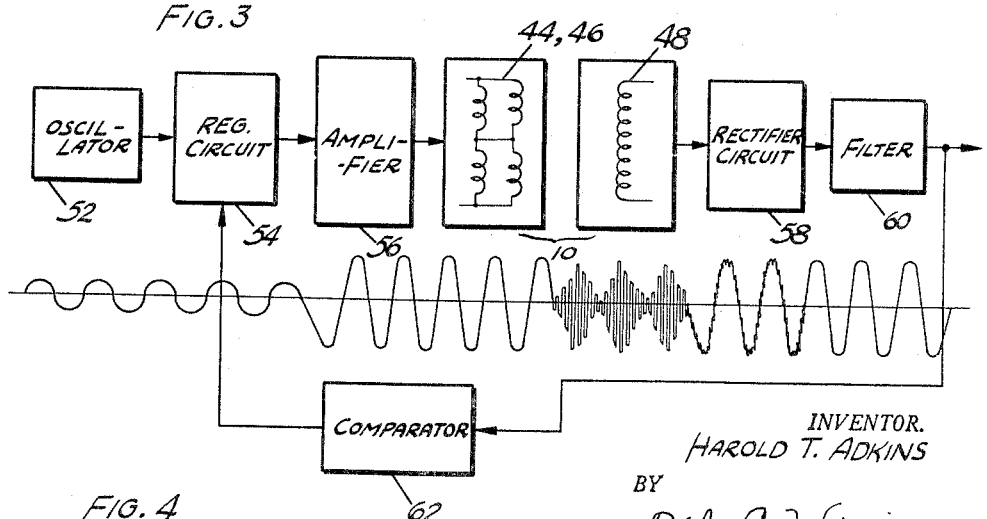
FIGURE 4 is a block diagram of the control unit of the high speed generator of FIGURES 1 and 2 with wave forms shown relative to respective wave form altering control parts.

FIGURE 4 shows one means of accomplishing the objectives last mentioned.

The output of an oscillator 52 of the electrical, electronic or electro-mechanical type may be used to produce a varying field current within the field windings 44, 46 by either direct connection or through a regulator 54 and power amplifier 56. The amplitude modulated power output of the power windings 48 is fed into a rectifier or switching rectifier circuit 58. The output signal is thus rectified and, with the switching rectifiers, converted to an alternate positive and negative going wave form at the desired power frequency. A filter 60 may be used to remove the high frequency ripple, where desired, and, with ordinary rectifiers, the D.C. component, to obtain the desired output.

The output may be fed back through a comparator 62 to the regulator circuit 54 to vary the field current and maintain a constant output voltage.

It will be appreciated that the power required in the field winding circuit 44, 46 is only a small fraction of the output power obtained.

Multiple phase frequencies are obtainable by means of multiple section generators and related circuitry as regards the generator just described.

Certain modifications and improvements are within the spirit and scope of this invention, as regards the generator just described, and these include, but are not restrictive to, an increase in the number of stator and rotor teeth for a given size generator, within permissive air-gap limitations, to obtain the same frequency at lower rotor speeds or a higher frequency, compatible with iron loss, for increased ease of filtering and winding simplicity.

Figure 5:
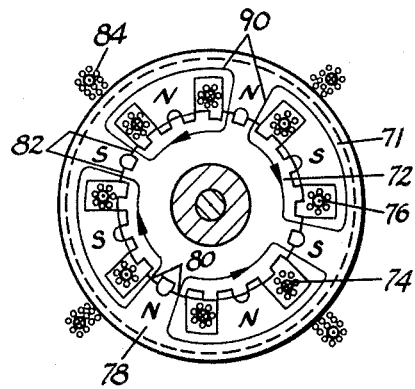
FIGURE 5 is a diagrammatic illustration of another form of stator winding and rotor-stator configuration suitable for use in the practice of this invention.
Figure 6:
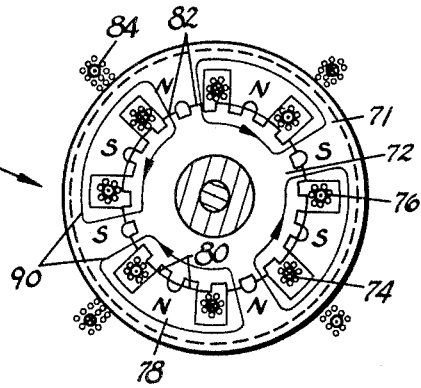
FIGURE 6 is similar to FIGURE 5 with the rotor shown in a 180° electrically advanced position.
Figure 7:
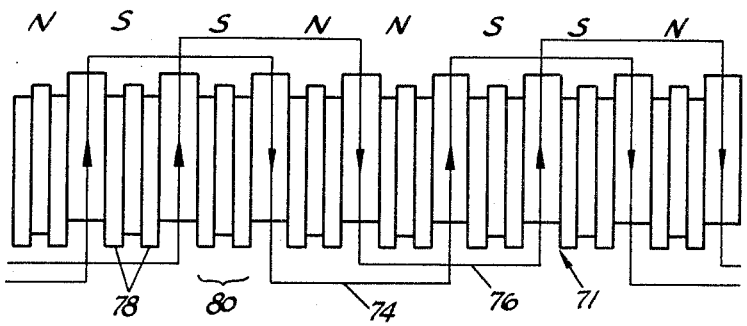
FIGURE 7 is an open projection of the stator of FIGURES 5 and 6 showing a different form of winding, the direction of the field and power windings, etc.

In FIGURES 5–7 is shown a generator 70 including a stator 71 and a rotor 72 driven by a prime mover and having a field winding 74 and a power winding 76 provided within the stator. The stator is inclusive of major teeth forms 78 and each major tooth form includes two minor tooth forms 80. The rotor includes equally spaced teeth 82 having the same pitch as the minor teeth 80 of the stator. The slots or spaces between the major stator teeth 78 are equal to the width of one minor tooth and a minor slot width, or multiples thereof, and are alternately receptive of the field winding 74 and power winding 76.

The field winding 74 may be of the toroidal or loop-skein type. The toroidal type winding has the field turn passing through the field slot and returning back across the outer side of the stator ring; as at 84 in FIGURES 5 and 6. The loop-skein winding is a skein type winding preformed, or formed within the field winding slots to include end-turn loops alternately on opposite sides of the generator; as shown by FIGURE 7.

The power winding 76 is of the loop-skein type and passes through the alternately disposed power winding slots. The power winding normally includes less turns of a heavier wire and is preferably stranded to reduce the skin effect.

A comparison of FIGURES 5 and 6 shows the different paths for the flux lines 90 for the 180° electrical rotor tooth displacements. The loops of the power winding 76 will be noted to be cut by flux paths passing in first one direction and then the other. Accordingly, an alternating current is generated in the power winding with a complete voltage reversal for each rotor tooth progression.

Figure 8:
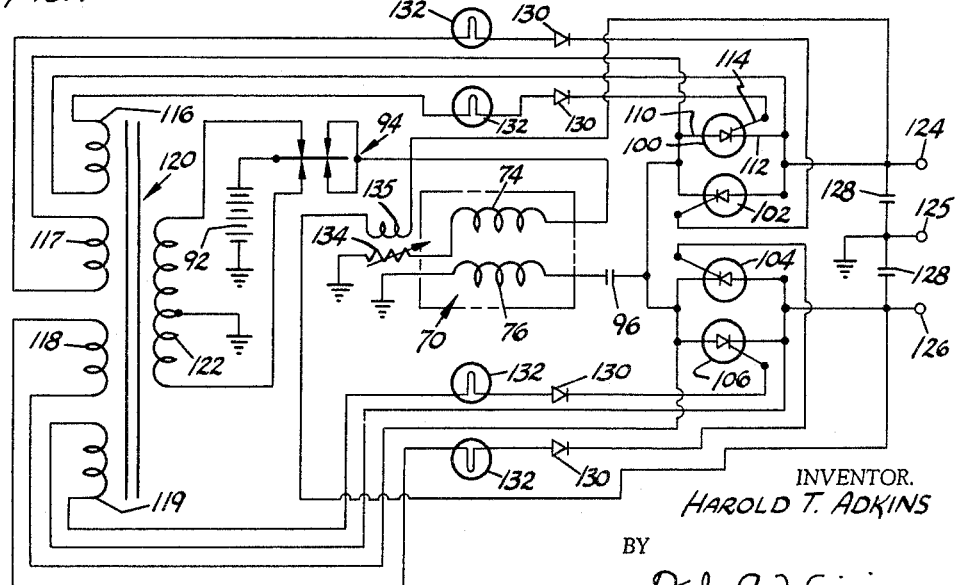
FIGURE 8 is an electrical schematic of the typical field modulation generator and related circuitry.

Referring to FIGURE 8 the field winding 74 is connected to a power source 92 through a frequency and wave form prescribing device, such as a vibrator 94. This constitutes the excitation means for field and control circuits, as will be subsequently described. The power winding 76 is connected through a series resonant capacitor 96 to four silicon controlled rectifiers 100, 102, 104 and 106. The series resonant capacitor 96 serves to neutralize the inductive reactance of the power winding 76. The silicon controlled rectifiers are arranged in pairs 100, 102 and 104, 106 and opposite polarity connected silicon controlled rectifiers 100, 104 and 102, 106 of each pair are gated for conduction at any one time. The silicon controlled rectifiers each include an anode 110, cathode 112 and gate 114. Each cathode and gate are connected to one of the four secondary coils 116–119 of the transformer 120. The transformer primary coil 122 is energized through the excitation means 94. The transformer 120 serves to isolate the gate energizing sources (coils 116–119) which in turn control the silicon controlled rectifier output since the silicon controlled rectifiers conduct in one direction as rectifiers when, and only when, the gate is positive relative to the cathode.

Opposite pairs of silicon controlled rectifiers conduct alternately at the desired power frequency, as prescribed by the excitation means, to provide an alternating voltage output at output terminals 124, 125, and 126. The output across terminals 124 and 126 with respect to the ground terminal 125, are equal and opposite in polarity. Thus, for example, a 110-volt output is obtainable between terminals 124 and ground and between terminal 126 and ground while 220 volts is obtainable across terminals 124 and 126. The capacitors 128 serve to filter out the high frequency ripple from the power output.

Diodes 130 and lamps 132 may be provided in the silicon controlled rectifier control circuits for protection of the silicon controlled rectifiers in the event of excess excitation voltage.

A regulator 134 may be inserted in the field circuit 74 to maintain a constant output voltage level. A coil 135 connected to the output leads 124 and 126 provides a form of feed back control therefor.

As with the previous generator and regulator circuitry, several similar generator sections and phase shifted excitors may be connected so as to produce multiple phase output power.

Thus far, controlled field excitation means have been described for wave form control of the generated high frequencies in order to obtain normal power frequencies. However, a constant high frequency output may be modulated externally of the generator to provide normal power frequencies. This enables the use of the aforementioned generators with constant field excitation, permanent magnet field generators, normal salient pole generators, induction generators, etc. for use in generating the high frequency powers to be converted. Further, a one section generator may be used to obtain a multiple phase output.

Figure 9:
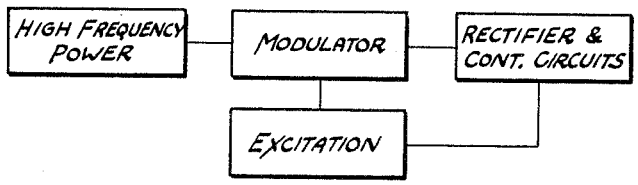
FIGURE 9 is a block diagram of one form of external generator output control.

The constant amplitude high frequency power output from a generator may be amplitude modulated before entering the rectification and control circuits by the use of controlled reactors, magnetic amplifiers, variable resistance, variable conduction region or occasional power cycle selection, etc. Reference FIGURE 9. The amplitude modulated high frequency is then fed into controlled circuitry as previously discussed.

Amplitude modulation of the generator output may be eliminated by a circuit such as shown by FIGURE 8 with the field coil 74 directly connected to the power source 92 instead of being interrupted. The silicon controlled rectifiers are used precisely as before and they are controlled as before regarding when to rectify the high frequency power; thus providing normal power frequency output of the desired output polarity, wave form and phase angle. Although the wave form obtained is not as controllable, it is nevertheless suitable for many purposes.

Figure 10:
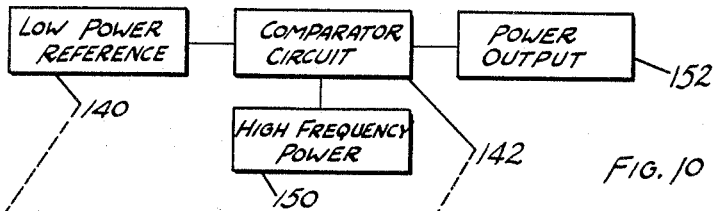
FIGURE 10 is a block diagram of another form of external generator control including a comparison and power controlling circuit.
Figure 11:
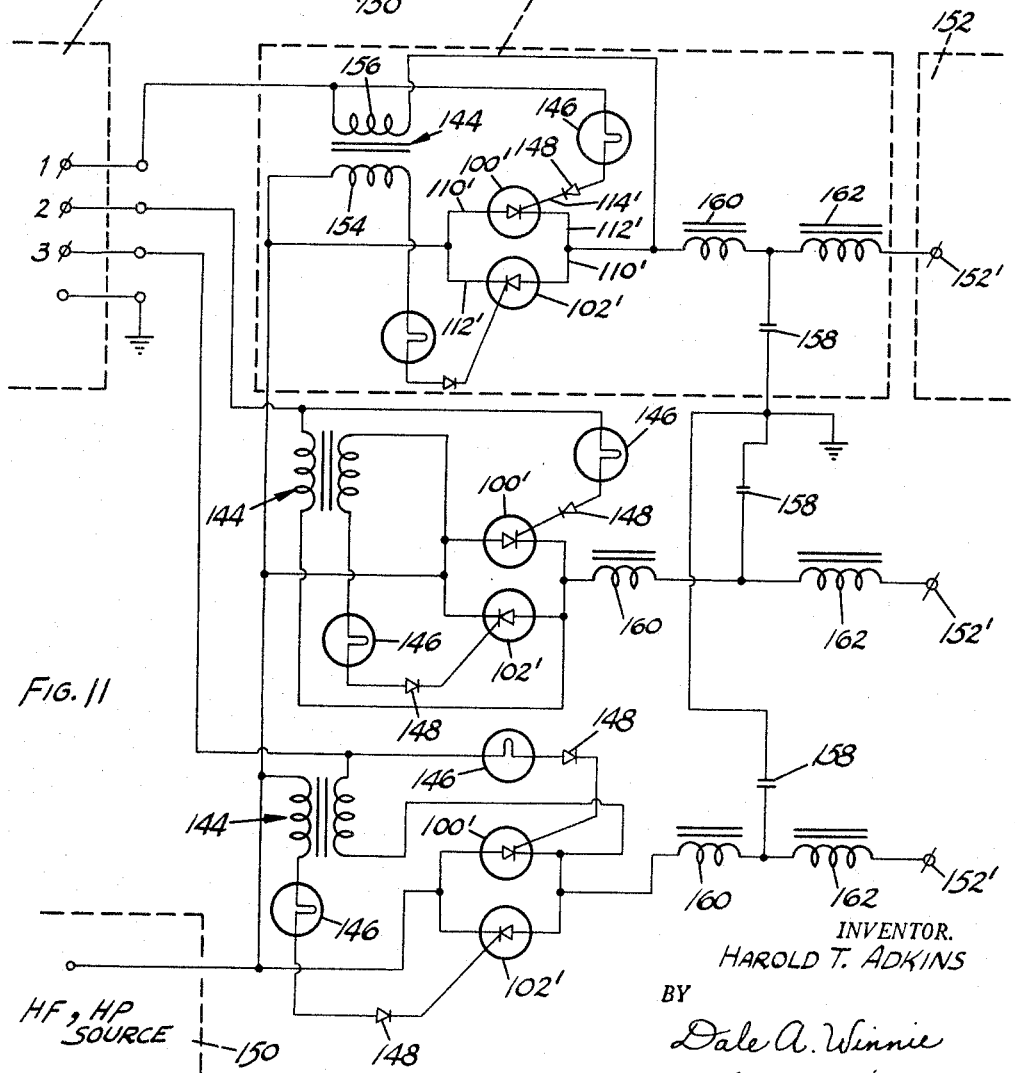
FIGURE 11 is a detailed schematic of a comparison and power controlling circuit providing three phase output.

Exacting output requirements may be met by a feed back circuit including comparator aspects; such as shown by FIGURES 10 and 11.

A low power control or reference source 140 originates the desired output voltage, frequency, wave form and phase. This may be such as an electrical, electronic or electro-mechanical low power signal source. The output from the reference source 140 is connected to a comparator or feed back circuit 142. The schematic of FIGURE 11 shows the comparator 142 in dotted outline as for a single phase output. More particularly, the connection is to the gates 114' of opposite polarity connected silicon controlled rectifiers 100' and 102' through suitable isolation and protection devices; such as the transformer 144, lamp 146 and diodes 148. The high power high frequency output from a source 150, such as the generators 10 and 90, a power oscillator, etc., is fed into the input sides of the proper silicon controlled rectifiers 100' and 102'.

When the normal power frequency output voltage 152 falls below the voltage level of the reference source 140, at output terminals 152', the appropriate silicon controlled rectifier 100' or 102' is automatically gated to conduct as a rectifier by the difference in voltage level between the gate 114' and the cathode 112'.

The transformer 144 induces a voltage in its secondary 154 of the proper direction necessary to initiate silicon controlled rectifier rectification when a voltage exists across its primary 156; which is only when a difference exists between the reference and output voltages. Thus one of the pair of silicon controlled rectifiers 100' or 102' supplies the positive swing and the other the negative swing to obtain the A.C. power output.

The capacitors 158 serves the same function as with respect to the previous generator circuit; that is, integration and filtering of the high frequency pulses to remove high frequency ripple. The inductors 160 and 162 may be used to further reduce high frequency output variations.

Different phase, voltage, frequency or wave form references may be fed other and similar circuits to provide corresponding output. Accordingly, a single generator, or other high frequency power source, may be used to obtain a multiple phase, voltage, frequency or wave form output.

The circuit last mentioned provides an output voltage and wave form independent of excessive generator voltage, field current or modulation, load characersitics, high frequency generator speed or frequency, etc.

I claim:
1. An inductor type generator having a high frequency high power electrical output and including in combination therewith a control circuit comprising: variable excitation means connected to the field winding of said inductor type generator, opposite polarity connected pairs of controllable rectifiers connected to the power output winding of said generator, and rectifier control means operatively connected to said rectifiers and in isolated power receptive engagement with said excitation means for alternate conduction by said opposite polarity connected of said pairs of rectifiers at the power frequency prescribed by said excitation means.

2. The control circuit of claim 1 wherein said excitation means includes a low and constant power source connected directly to said generator field windings for eliminating amplitude modulation of the generator output.

3. A self-regulatory circuit for changing the high frequency high power output from a source into a lower frequency high power output, and comprising: a low power reference source providing the desired output voltage, wave form and phase characteristics, opposite polarity connected and controllable rectifiers having the input terminals thereof connected to said high power source, and means responsive to the relative polarity difference between said reference source and said power output connected between said rectifiers and said reference source for automatic and alternate conduction control through one of said rectifiers when said power output falls below the voltage level of said reference source.

4. Self-regulatory means for obtaining low frequency A.C. power having a desired voltage, wave form and phase from a higher frequency A.C. power producing source, and comprising: a pair of opposite polarity connected silicon controlled rectifiers having a source of high frequency power connected to their input sides, a reference source of low frequency power having the desired voltage wave form and phase characteristics connected to the gate of one of said silicon controlled rectifiers for automatic rectification and integration therethrough when the voltage level on the output side of said one rectifier is of a lower relative magnitude to the voltage level of said reference source, and isolation means including inductive means responsively to the voltage level difference last mentioned connected to the gate of the other of said silicon controlled rectifiers for opposite polarity control thereof as regards said first mentioned rectifier.

5. Frequency conversion apparatus of the type which accepts high frequency alternating potential from a source of substantial power capability and by switching rectification means converts the same into low frequency alternating potential of substantial power capability, comprising a first solid state device and a second solid state device each having anode, cathode and gate electrodes, the anode of the first solid state device and the cathode of the second solid state device being connected together and to the high frequency source, the cathode of the first solid state device and also the anode of the second being connected together and to a charging network which includes a capacitor, the charging network providing at its output the desired low frequency potential, and means for energizing the gate-cathode electrode circuits of the two solid state devices with respective switching potentials having time variation at said low frequency, the switching potentials being timewise displaced from each other by one-half the low frequency period.

6. Apparatus according to claim 5, wherein the solid state devices are silicon-controlled rectifiers.

7. Apparatus according to claim 5, wherein the switching potentials correspond to the difference between an alternating reference potential having the same frequency as the desired low frequency output potential, and the low frequency output potential itself.

8. Apparatus according to claim 5, wherein the high frequency potential source is an alternator having field and power windings, the alternator power windings delivering the high frequency potential, characterized in that a source provides alternating potentials at the desired low frequency, the latter potentials serving as the aforesaid switching potentials and also for energizing a circuit that includes the field windings, whereby the high frequency potential delivered by the power windings is amplitude-modulated at said low frequency, the solid state devices demodulating the same.

9. Apparatus according to claim 8, wherein a series resonant capacitor interconnects the power winding to the circuit junction of the anode of the first and cathode of the second solid state devices, and in that a third and a fourth solid state device are provided each also having an anode, a cathode and a gate electrode, the cathode of the third solid state device and the anode of the fourth being connected together and also to said circuit junction, the anode of said third solid state device and the cathode of the fourth being connected together and to a charging network which includes a capacitor, the gate-cathode circuit of the third solid state device being energized by a switching potential which is synchronous with the switching potential for the gate-cathode circuit of the first solid state device, and the gate-cathode circuit of the fourth solid state device being energized by a switching potential which is synchronous with the switching potential for the gate-cathode circuit of the second solid state device.

10. Apparatus according to claim 9, wherein the field current circuit includes a variable resistor which is electro-mechanically varied in accordance with the desired low frequency output potential to regulate the latter.

11. Apparatus according to claim 5, wherein each gate-cathode circuit includes a gate-cathode current limiting device.

12. Apparatus according to claim 11, wherein each current limiting device is a lamp having a filament through which the gate-cathode current passes, such current heating the filament and thereby increasing its resistance to prevent such current from becoming excessive.

13. Apparatus according to claim 5, wherein each gate-cathode circuit includes a diode that is poled to permit passage of gate-cathode current.

References Cited by the Examiner

UNITED STATES PATENTS

| | | | |
|---|---|---|---|
| 2,399,905 | 5/46 | Baumann | 310—168 |
| 2,648,021 | 8/53 | Kaczor | 310—168 |
| 2,831,156 | 4/58 | Mathews et al. | 322—24 |
| 2,854,617 | 9/58 | Johnson | 322—32 |
| 2,966,623 | 12/60 | Mishkin | 318—148 |
| 3,001,124 | 9/61 | Johnson | 322—61 |

FOREIGN PATENTS 599,730  3/48  Great Britain.

MILTON O. HIRSHFIELD, *Primary Examiner.*